United States Patent [19]

Sinkkonen

[11] Patent Number: 4,861,187
[45] Date of Patent: Aug. 29, 1989

[54] METHOD FOR ARRANGING THE COOLING IN A COMPACTOR AND A COOLING SYSTEM FOR THE REALIZATION OF THE METHOD

[75] Inventor: Matti Sinkkonen, Vaajakoski, Finland

[73] Assignee: Tana Jyra Ky, Vaajakoski, Finland

[21] Appl. No.: 181,076

[22] Filed: Apr. 13, 1988

Related U.S. Application Data

[63] Continuation-in-part of Ser. No. 44,431, Apr. 24, 1987, abandoned.

[30] Foreign Application Priority Data

May 4, 1987 [CA] Canada .................................. 536250
Apr. 14, 1988 [FI] Finland .................................. 871624

[51] Int. Cl.⁴ ............................................. E01C 19/26
[52] U.S. Cl. ..................................... 404/72; 404/121; 165/51; 165/90
[58] Field of Search ................. 404/95, 121, 122, 124, 404/129, 130; 180/20; 165/51, 90

[56] References Cited

U.S. PATENT DOCUMENTS

| | | | |
|---|---|---|---|
| 197,713 | 12/1877 | Abbott | 404/95 |
| 524,939 | 8/1894 | Dennison | 404/95 |
| 1,237,634 | 8/1917 | Gratton | 404/122 |
| 1,322,092 | 11/1919 | Browne | 180/20 |
| 1,421,665 | 7/1922 | Browne | 404/130 |
| 1,517,501 | 12/1924 | Greene | 404/122 X |
| 2,248,478 | 7/1941 | Mall | 404/117 |
| 2,534,507 | 12/1950 | Essick | 180/20 X |
| 3,008,389 | 11/1961 | Hicks | 404/130 |
| 4,009,967 | 3/1977 | Layton | 404/129 |
| 4,261,112 | 4/1981 | Apitz | 165/90 X |
| 4,342,485 | 8/1982 | Tuneblom | 299/39 |

FOREIGN PATENT DOCUMENTS

| | | | |
|---|---|---|---|
| 57292 | 3/1980 | Finland | |
| 388887 | 10/1976 | Sweden | |
| 422815 | 8/1974 | U.S.S.R. | 404/122 |

Primary Examiner—Jerome W. Massie
Assistant Examiner—Gay Spahn
Attorney, Agent, or Firm—Hale and Dorr

[57] ABSTRACT

The object of the invention is a method of arranging the cooling in a compactor equipped with at least one roller drum, in which the motor and/or other equipment, for example the hydraulic system, has forced circulation water cooling or water cooled closed forced circulation air cooling. The intention of the invention is to remove the problem of the dirtying of the radiator cells that exists in present cooling systems.

In the method in accordance with the invention the cooling water is circulated through the roller and is brought in thermal contact with the outer covering of the roller in order to transfer the heat from this to the surrounding air and to the ground. Further, a heat exchanger through which coolant flows may also be placed inside the roller, immersed in a second volume of cooling fluid. The heat exchanger may be placed into direct physical contact with the outer cover of the roller.

14 Claims, 5 Drawing Sheets

METHOD FOR ARRANGING THE COOLING IN A COMPACTOR AND A COOLING SYSTEM FOR THE REALIZATION OF THE METHOD

This application is a continuation-in-part of U.S. patent application Ser. No. 07/044,431, abandoned.

BACKGROUND OF THE INVENTION

The object of this invention is a method to arrange cooling in a compactor equipped with at least one roller drum, in which the motor and/or other equipment, for example the hydraulic system, has forced circulation water cooling or water-cooled forced circulation air cooling. The invention is also concerned with a cooling system intended to realize the method. In this case forced circulation water is taken to mean any liquid substance at all applicable to heat exchange, most typically a mixture of water and an anti-freeze substance.

In an ordinary cooling system the hot water coming from the motor is led to a cellular radiator, in which an attempt is made to ensure effective heat exchange by using a large surface area. The working conditions of compactors are extremely dusty in, among other places rubbish tips and coalfields. This causes blockage of the radiator cells, which in turn often causes overheating in the motor.

Taken broadly the field of the invention includes the solution in accordance with U.S. publication No. 4,342,485, which presents the partial immersion cooling of a planetary gearbox installed in the drum of a cold surface planer for concrete and asphalt surfaces. According to this the cooling is improved by partially filling the drum with liquid coolant, which effectively conducts the heat from the surface of the gearbox to the surface of the drum.

It is the intention of this invention to create a simple method to arrange the cooling in a compactor and a cooling system to realize the cooling system. With the aid of the invention an attempt is made to remove the problem of dirt in the aforementioned known forced circulation water cooling systems. As used in this specification and the claims, "axle shaft" means also one-piece axle ends, in which corresponding channels to the center of the drum have been formed.

SUMMARY OF THE INVENTION

According to the method and apparatus of the invention, heat exchange is provided between the engine or hydraulic cooling system and liquid coolant partially filling and in thermal contact with the roller drum. The heat exchange may be accomplished by running the coolant through heat exchangers and the drum, or more efficiently, by placing the heat exchangers physically inside the coolant-filled drum. It is further possible to place the heat exchanger into direct physical contact with the roller drum.

In what follows the invention is depicted in greater detail with the aid of descriptions and the accompanying illustrations, which show various forms of application of the invention.

DETAILED DESCRIPTION OF A PREFERRED EMBODIMENT OF THE INVENTION

Figure 1:
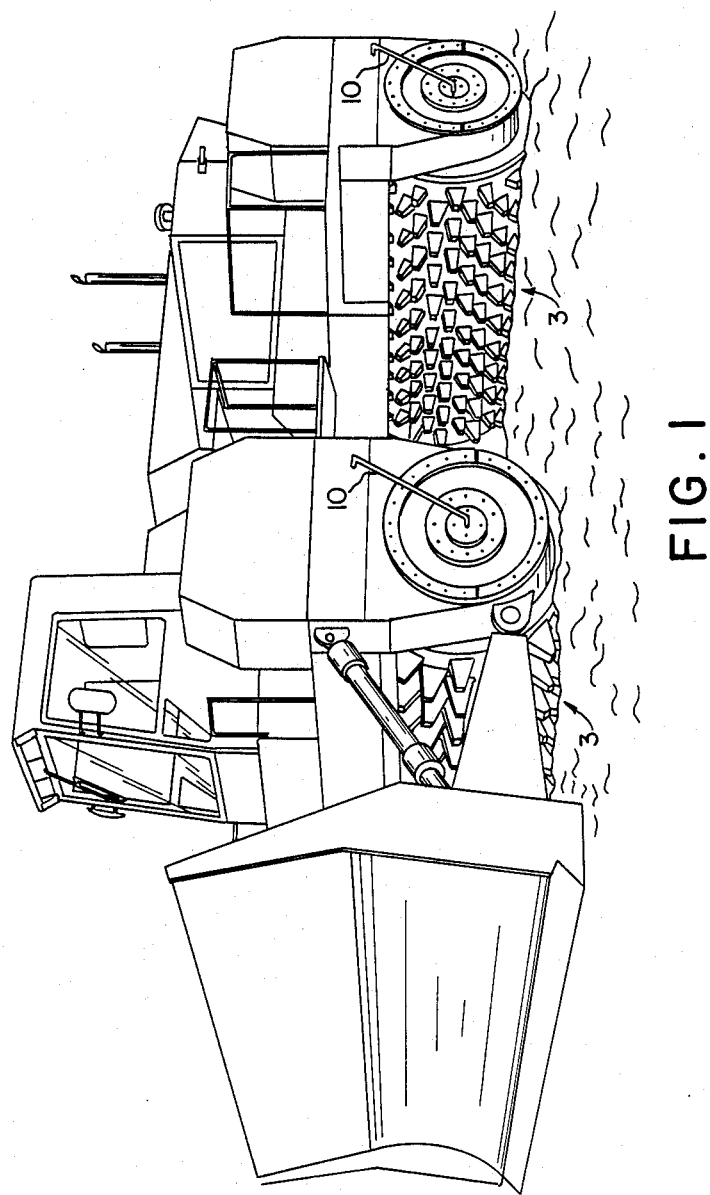
FIG. 1 shows a compactor, in which there is roller drum cooling.

The typical power of the motor of a large compactor is 400 hp. In a compactor of this kind a maximum cooling power of about 110 kW is required when the cooling requirement of the hydraulic system is included. The length of the rollers of the compactor in FIG. 1 is about 4 m and their surface area is sufficient to transmit the heat from the roller even under hot conditions. What makes the invention especially advantageous is that the length of the roller and thus its heat exchange surface area is nearly comparable to the size of the compactor and its motor in modularly constructed compactors. The roller drum cooling in accordance with the invention can thus be applied easily and by exploiting the modular method of construction in all sizes of compactors.

The heat is principally transferred from the roller to the ground, for the amount transferred to the air is small unless it is increased by means of ventilation and immersion. However, often the material to be compacted, for example garbage in a rubbish tip, is so wet that the surface of the roller becomes wet and the heat exchange is increased also by means of the natural phenomenon of evaporation. In compactors used in among other places garbage compacting spikes are on the rollers, and these improve the heat exchange considerably, as in the compactor in FIG. 1. This illustration shows the system in which the cooling circulating water inlet pipe 10 is connected to the end of the roller 3. A more exact depiction of this system is provided below.

Figure 2:
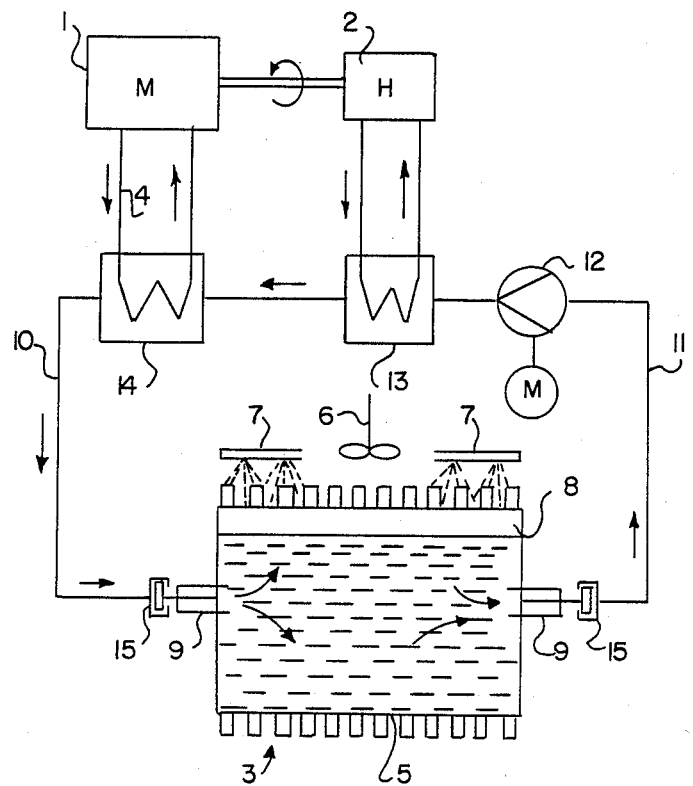
FIG. 2 shows diagrammatically the principle of the cooling system.

For practical reasons it is advantageous to use indirect cooling, in which the motor 1 has a separate forced circulation water circuit 4, which is cooled by means of heat exchange 14 connected to the roller 3 by means of an auxiliary forced circulation water circuit. The cooler 13 for the hydraulic oil is also installed on this auxiliary circulation circuit, FIG. 2. The auxiliary circulation circuit consists of, in addition to the roller 3, an inlet and return pipe 10, a pump 12, and the aforementioned heat exchangers 13 and 14.

In this circulation circuit the roller 3 also forms an expansion reservoir when a space 8 for gas has been left on it. It can be easily observed from FIG. 2 that from the point of view of the invention it makes no difference even if the motor has closed forced air cooling in place of the aforementioned water cooling.

The water heated in the motor 1 and the hydraulic system 2 is led along the inlet pipe 10 and through the pressure bearing 15 and the axle shaft 9 to the roller 3 and is taken out through the opposite end. The circulating water comes in contact with the outer cover 5 of the roller 3, in which case the heat exchange is convective and thus effective. The pump 12, which creates the flow of the circulation, in located at the coldest part of the flow circuit, i.e. before the aforementioned heat exchangers 13 and 14.

In order to improve the heat exchange a flow of air is directed if required at the roller 3 by means of a fan 6 and it is watered by a flow of water from sparge pipe 7.

Figure 3:
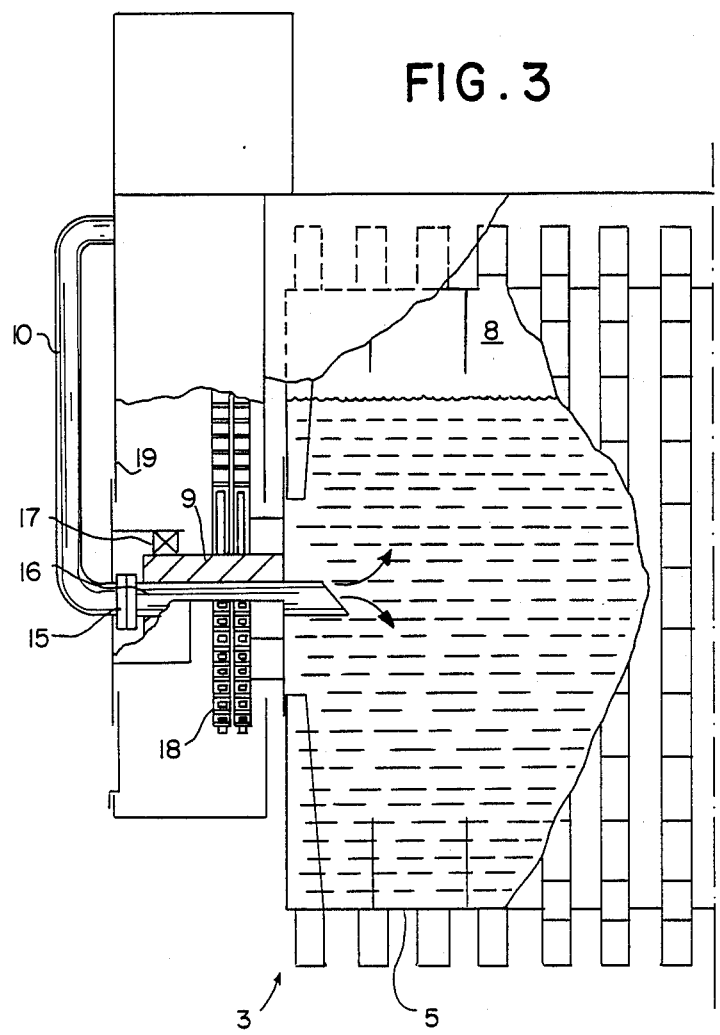
FIG. 3 shows the arrangement of the water connection to the roller.

Referring now to FIG. 3, in a cooling system in accordance with the invention the central feature is the connection of the water circulation pipes 10 and 11 to roller 3. Roller 3 itself is in principal a stiffened cylinder, at the ends of which axle shafts 9 are secured. Pipe 16 is fitted through one end, and at its end is the pressure bearing 15 which is connected to inlet pipe 10. This creates a watertight connection which permits, however, the roller 3 to remove normally. The outlet pipe 11 is connected in a corresponding manner to the other side of roller 3.

Roller 3 is supported by the bearing 17, which is secured to a housing fixed to frame 19. Drive to roller 3 takes place by means of chainwheel 18. If the places of bearing 17 and chainwheel 18 are exchanged and the bearing fitted inside the roller cylinder the water connection can be installed entirely within the same sheet metal frame housing.

Figure 4:
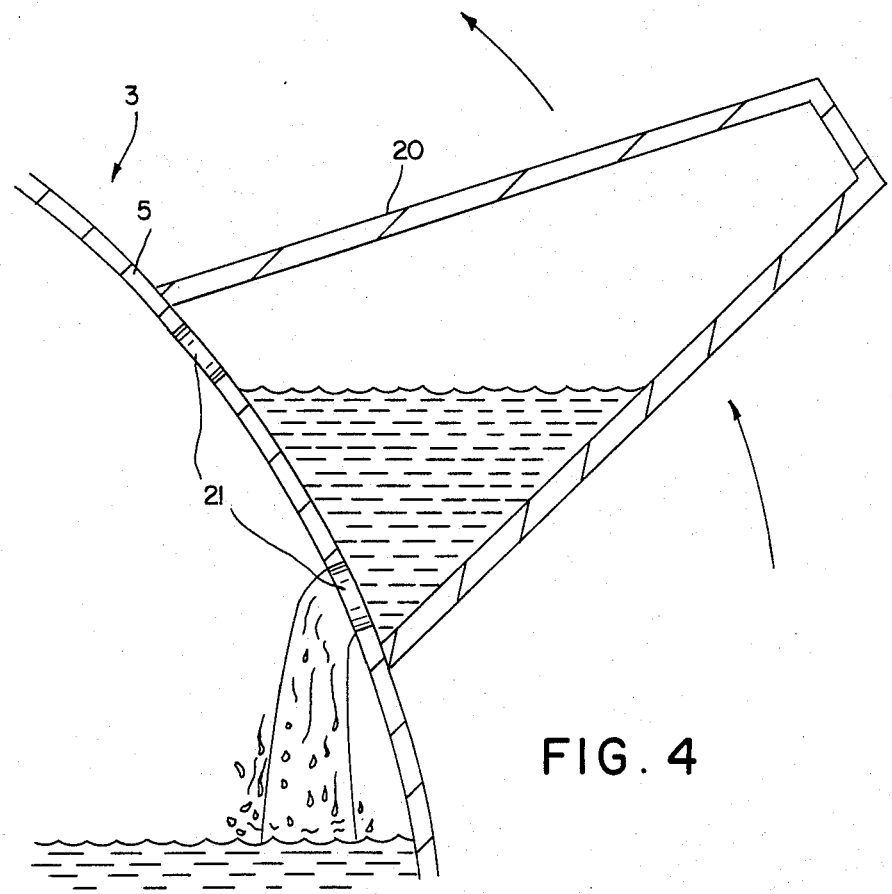
FIG. 4 shows the arrangement for the circulation of water inside the spikes of the roller.

The heat transmission capacity outwards of the external covering 5 of roller 3 is considerably increased with a system in accordance with FIG. 4. The spikes 20 of roller 3 are hollow and holes 21 are drilled in the drum, through which the cooling water passes into the spike 20 and out of it. As roller 3 revolves a powerful convective exchange of heat arises by means of this from the circulating water to the spikes 20.

Figure 5:
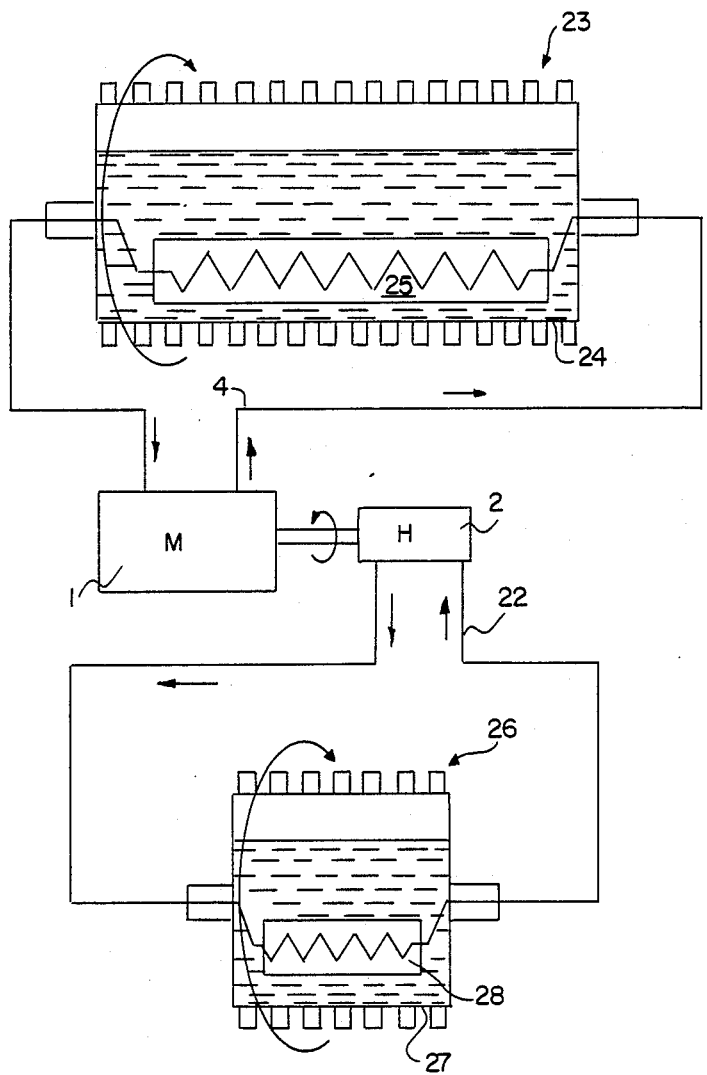
FIG. 5 shows diagrammatically a cooling system where heat exchange takes place within the roller.

Referring now to FIG. 5, as has been stated above it is practical to use indirect cooling, in which the water circulation circuit 4 of the motor 1 and the oil circulation circuit 22 of the hydraulic system 2 include cooling heat exchangers 25 and 28. It is, however, most advantageous to place these inside the rollers 23 and 26 in accordance with FIG. 5, in which case additional pumps are not required at all. In connection with the differently sized rollers 23 and 26 it is possible to adjust directly the cooling power to correspond to that required by both the motor 1 and the hydraulic system 2 in such a way that the larger roller 23 is used to cool the motor 1 and the smaller roller 26 is used to cool the hydraulic system 2.

The cooling of the motor 1 takes place with the aid of the heat exchanger 25, which is placed inside roller 23 and which is part of the forced circulation water cooling circuit 4, and from which the heat is transferred to the liquid coolant inside the roller and with the aid of this to the outer surface 24 of the roller. It should be noted that the cooling water is in thermal contact with the outer covers of the roller 3. As roller 23 turns the heat is transferred both from the heat exchanger 25 to the coolant and from it on to the surface 24 with the aid of forced convection in such a way that the turning movement creates a considerable velocity of flow in the coolant. The cooling of the hydraulic system 2 operates in a corresponding manner in the smaller roller 26. The heat from the oil circulation circuit 22 is transferred from heat exchanger 28 inside the roller 26 to the coolant and from this to the outer surface 27.

Figure 6:
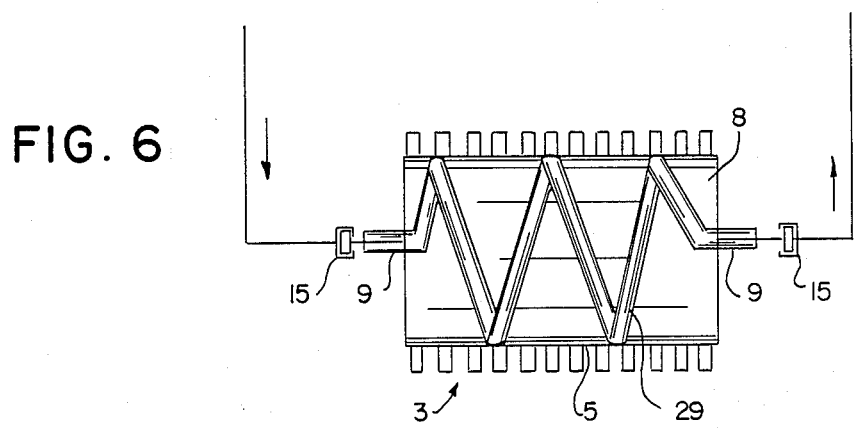
FIG. 6 shows diagrammatically a cooling system where the heat exchange has direct physical contact to the outer cover of the roller.

Referring now to FIG. 6, a preferred embodiment of the invention is shown where a heat exchanger pipe 29, through which travels the cooling fluid, is in direct physical contact with outer cover 5 of the roller 3. The direct physical contact increases the heat exchanging capacity. The attachment may be by any conventional means, such as welding. In this case, because the heat exchanger rolls with the drum, rotary pressure bearings 15 are required.

The foregoing description should be considered to be illustrative and not limiting in any sense.

Having described the invention, what is claimed is:

1. A method for arranging cooling in a compactor equipped with a motor and at least one roller drum having an outer cover, in which the motor has forced circulation fluid cooling comprising the steps of:
   a. circulating the cooling fluid through the roller; and
   b. bringing the cooling fluid in thermal contact with the outer cover of the roller to transfer the heat from the cooling fluid to the roller to the surrounding air and the ground.

2. A method in accordance with claim 1, further comprising the steps of:
   a. providing a fan; and
   b. directing air from said fan at the roller drum acting as a radiator in order to improve the transfer of the heat.

3. A method in accordance with claim 1 further comprising the step of watering the surface of the roller drum acting as a radiator with a small flow of water in order to improve the transfer of heat by means of evaporation.

4. A cooling system for a compactor equipped with at least one roller drum and a motor in which the motor has a forced circulation fluid cooling system, in which the at least one roller drum is supported by bearing supporting axle shafts having two ends, characterized in that channels are formed in the axle shafts of the roller drum from the ends into the roller and that the ends of the axle shafts include connectors and pressure bearings by means of which inlet and return pipes of the forced circulation fluid cooling system are connected to the inside of the roller.

5. A compactor cooling system as claimed in claim 4, in which the roller of the compactor includes spikes, characterized in that at least some of the spikes of the roller include a hollow space and that this space is connected by at least one channel to the forced circulation fluid inside the roller.

6. A method for providing cooling in a compactor having at least one hollow roller drum and a motor cooled by a forced circulation fluid cooling system, comprising the step of circulating the forced circulation fluid through the interior of the roller such that the fluid thermally contacts the inside of the roller and transfers heat from the fluid to the roller to the surrounding air and to the ground.

7. The method of claim 6 where the compactor further comprises a hydraulic system cooled by a forced circulation fluid comprising the further step of circulating the forced circulation fluid for the hydraulic system through the interior of the roller such that the fluid thermally contacts the inside of the roller and transfers heat from the fluid to the roller to the surrounding air and to the ground.

8. The method of claim 6 where the forced circulation fluid is water.

9. The method of claim 6 where the forced circulation fluid is air.

10. The method of claim 6 where the compactor further has auxiliary equipment cooled by a forced circulation fluid comprising the step of circulating the forced circulation fluid for the auxiliary equipment through the interior of the roller such that the fluid thermally contacts the inside of the roller and transfers heat from the fluid to the roller to the surrounding air and to the ground.

11. A method for providing cooling in a compactor equipped with a motor cooled by forced circulation fluid and at least one hollow drum roller having an outer cover comprising the steps of:
 (a) providing a heat exchanger situated inside and in thermal communication with the hollow roller; and
 (b) circulating the circulation fluid through the heat exchanger; so that the heat is transferred from the fluid, to the heat exchanger, to the roller and to the ground and air.

12. The method of claim 11, wherein said heat exchanger comprises at least one element physically contacting the outer cover of the roller.

13. The compactor cooling system of claim 5, further comprising a heat exchanger through which the circulation fluid circulates, which heat exchanger is situated inside the hollow roller.

14. The compactor cooling system of claim 13 wherein said heat exchanger comprises at least one element physically contacting the outer cover of the roller.

* * * * *